United States Patent Office 3,143,415
Patented Aug. 4, 1964

3,143,415
METHOD OF PREPARING POSITIVES COMPRISING A HYDROPHILIC NITROCELLULOSE LAYER FOR PRINTING AND PLATE-MAKING USE
Masaharu Sasaki, 437 1-chome, Futaba-cho, Shinagawa-ku, Tokyo, Japan
No Drawing. Filed Dec. 5, 1960, Ser. No. 73,496
Claims priority, application Japan May 6, 1960
6 Claims. (Cl. 96—33)

This invention relates to positives for printing and plate-making use and the method of preparation thereof.

Heretofore, as film supports for positives used in plate making and printing, cellulose nitrate, cellulose acetate or matted resin sheets have been used. There were however defects in the use of these: The cellulose nitrate because of its flammability and high rate of expansion and contraction was unsuitable, whereas the cellulose acetate, although nonflammable, was unsatisfactory on account of its high expansion and contraction rate. The matted resin sheet, on the other hand, on account of its semitransparent character being a drawback could not be used for highly precise plate making and printing. Also, when considered from the standpoint of the sensitive emulsion, due to the fact that emulsions having silver halides as their chief component are used regardless of whether a dry or a wet plate is used, complicated facilities such as a darkroom, etc. are required on account of the high sensitivity of the emulsion, and the need exists for a wide variety of chemicals in developing operations. The films, particularly those in general use, because of the undercoating of gelatin on their surfaces are also readily affected by the degree of humidity. Moreover, there was the matter of mold growth in the gelatin layer as well as the discoloration (yellowish-brown) after developing on account of residual matters such as hypo, etc. I found a method of removing these defects with respect to the preparation of positives, of which is described hereinafter.

(1) A support was prepared in which a synthetic resin sheet such as polyester, etc. was given an undercoating on its surface of a collodion which consisted of nitrocellulose dissolved in alcohol-ether. An oxidizing pretreatment of this support was given with nitric acid and alum. By this step it is possible to improve the density of the emulsion adhering to the nitrocellulose.

(2) The sensitive emulsion was prepared by kneading and blending into a chromatype sensitive emulsion (gelatin and polyvinyl alcohol) comminuted chromatic powders of metallic oxides and carbonaceous substances, such as graphite.

(3) Next, the above-described emulsion was coated and dried thereby preparing a black or a chromatic dry plate.

(4) A negative already prepared was placed in contact with the support surface of this dry plate and printed by radiation from the negative side.

Since the film was coated in this manner with a chromatype emulsion, by developing with hot water-water after printing it was possible to obtain an opaque, black or a multichrome positive resulting from the metallic oxides and carbonaceous substances, such as graphite. Inasmuch as no residual matters at all were present in the non-image portion of the positive and it was completely transparent, I found that it was most suitable for positives for photographic as well as printing use.

In accordance with the present method, in view of the fact that the nitrocellulose applied as an undercoating to the synthetic resin sheets such as polyester, etc. is controlled by the non-flammability and high tensile strength of the latter, the support as a whole is non-flammable and possesses high tensile strength. Furthermore, that resin sheets such as polyester, etc. can be used as a film support to which emulsion can be coated is a notable feature of the present invention. Heretofore, the acid resisting property and tensile strength which were advantages became on the contrary hindrances rendering it impossible to directly coat the emulsion (gelatin and polyvinyl alcohol) and nitrocellulose. What has made this coating possible in the present invention is the thinness of the film of this nitrocellulose undercoating, which is less than 0.02 micron. The reason is because the thinner the film becomes its shrinkage becomes controlled by the tensile strength of the support to which it adheres. To be sure the support must be smooth. If the support is ground before applying the coating, the nitrocellulose would be able to shrink in the depressions caused by the grinding of the nitrocellulose, and thus spaces would be created between the nitrocellulose and the support at these depressions as to cause their separation. As to the process of rendering the nitrocellulose into a collodion and applying it to the polyester synthetic sheets, the following can be said.

The support whose undercoating has been completed by the treatment as described hereinabove does not lose at all its nonflammability, not to speak of its tensile strength, notwithstanding the adhesion of nitrocellulose to its surface. This undercoated resin support not only is completely nonflammable but also its tensile strength is not impaired in the least. And by oxidation the nitrocellulose undercoating becomes hydrophilic rendering not only possible the coating to the surface thereof gelatin and polyvinyl alcohol emulsion but also with the color image appearing printed out on the support it becomes possible to give it a washing spray with a strong shower after development to ensure the sharpness of the image.

Further, as reasons for kneading and blending in of chromatic powders of metallic oxides and carbon substances, such as graphite, etc. there may be enumerated the following: namely, the fact that opaque color images are obtained without depending on chemical changes of such as silver, etc.; the permanent preservation of positives is made possible, since carbon substances such as graphite, etc. are substances lacking particularly in chemical reactivity; that multicolored superposed images can be obtained by successive applications of coatings of the separate colors; and furthermore that the image was conspicuously sharp under a 100-power microscope as compared with that of silver in case of a comminuted powder of less than 0.05 micron; etc.

(1) *Pretreatment of the Nitrocellulose Undercoating*

A coating of a solution consisting of 25% (average) of nitrocellulose to alcohol-ether, that is, what is usually referred to as a collodion, was applied to a nonflammable transparent polyester synthetic resin sheet possessing high tensile strength, and the alcohol-ether was volatilized to form a film. If this undercoated film is thick, there is the possibility of separation of the nitrocellulose film layer with the progress of its hardening due to its contractility. When the aforesaid 25% collodion is coated, while the rate at which such undercoating is applied affects the thickness somewhat, on the average a thin film of less than 0.02 micron was formed as to render it completely inseparable.

The support whose undercoating has been completed was immersed in a solution of nitric acid and alum. In this case the solution used was of the following proportions:

$HNO_3$ ---------------------------------grams-- 1–5
$H_2O$ ---------------------------------cc-- 50
$K_2SO_4 \cdot Al_2(SO_4) \cdot 24H_2O$ ---------------grams-- 5–10

By this treatment the undercoated nitrocellulose was oxidized, and thus its water repellant property was converted to hydrophilic property. Nitrocellulose loses its explosive and flammable property essentially by this treatment and becomes slow burning.

(2) Preparation of the Emulsion

In the case of a sensitizer consisting of 1000 cc. of emulsion in a proportion of 1 of the starting gelatin colloid to 13 of water or an equivalent amount of polyvinyl alcohol of a polymerization degree of 500–600 to which has been added as the sensitizer 15 grams of bichromates, or in the case the sensitizer is to be applied during printing, the emulsion was obtained by kneading and blending into the aforesaid emulsion to which the sensitizer has not been added an opaque, comminuted chromatic powder, such as metallic oxides, etc., or graphite by utilizing the emulsion's glue-emulsion swelling-sponging phenomenon-adsorption property. While the proportion to be mixed of the comminuted powder of graphite or metallic oxides will vary depending upon its kind, an average of 100 grams to 1000 cc. of the emulsion is the optimum.

(3) Coating, Drying and Preparation of Dry-Plate (Film)

A coating of the black or chromatic emulsion (sensitive or nonsensitive emulsion) was applied to the nitrocellulose coated surface of the oxidized support. It was then dried by such as a hot current of air, infrared ray or dried air, the time for drying not being constant. Upon completion of drying, the resultant product was a dry-plate film covered with an opaque, black or chromatic film layer.

(4) Printing, Developing and Preparation of the Positive

A priorly prepared negative was placed in contact with the support surface (that is, the surface without the emulsion layer) and was printed by application of light from the negative side. Needless to say, in the case of those films to which no sensitizer has been added a sensitizer is added when being used. When the plate was placed in warm water or water immediately subsequent to its exposure the nonexposed portion of the film dissolved out, and the positive image appeared. The strength of the adhesion between this undercoating and the image was also evident from the fact that no matter how strong a washing spray was used, that is, performing cutting for a sharp cut of the image lines, separation did not occur in the least. Also no residual matter at all was left in the non-image portion. In contrast, in the case of films using silver halide, residual silver that cannot be completely removed as well as residual matters of such as hypo, etc. with the gelatin undercoating cannot be avoided.

After completion of the development, the film was dried and then wiped well with benzene. Thus, a sharp positive of high quality for use in plate making or printing was obtained.

Having thus set forth the nature of the invention, what I claim herein is:

1. A method for preparing a sheet material useful in reproducing images which comprises coating one surface of a transparent smooth sheet of polyester resin with a film consisting of nitrocellulose having a thickness of less than about 0.02 micron, contacting said nitrocellulose film with an aqueous solution of nitric acid and alum to adhere said nitrocellulose film to said polyester sheet and to render said nitrocellulose film hydrophilic, applying to the treated nitrocellulose film a thin coating of an aqueous emulsion of a hydrophilic substance selected from the group consisting of gelatin and polyvinyl alcohol, said aqueous emulsion of said hydrophilic substance containing a comminuted opaque chromatic powder, and drying said emulsion coating to provide a film coating of said hydrophilic substance containing said comminuted opaque chromatic powder on said treated nitrocellulose film.

2. The method according to claim 1 wherein subsequent to said drying step said film coating of said hydrophilic substance is treated with a bichromate photosensitizing agent.

3. The method according to claim 2 wherein subsequent to said treatment of said film coating of said hydrophilic substance with said bichromate photosensitizing agent, an area of the resultant treated hydrophilic substance coating is exposed to light, said exposed area representing a negative of a predetermined image, and the exposed hydrophilic substance coating of said sheet material thereafter is washed with water to remove said hydrophilic substance coating from said sheet material in the area unexposed to said light.

4. The method according to claim 1 wherein said opaque chromate powder is graphite.

5. A sheet material useful in reproducing images comprising a smooth transparent base sheet of polyester resin, an adherent coating on one surface of said base sheet of a hydrophilic film of nitrocellulose having a thickness of less than about 0.02 micron, said film of nitrocellulose being rendered adherent to said base sheet and hydrophilic by treatment with an aqueous solution of nitric acid and alum, and a coating on said hydrophilic nitrocellulose film of a hydrophilic substance selected from the group consisting of gelatin and polyvinyl alcohol, said coating of said hydrophilic substance containing a comminuted opaque chromatic powder.

6. The sheet material according to claim 5 wherein said opaque chromatic powder is graphite.

References Cited in the file of this patent

UNITED STATES PATENTS

| | | |
|---|---|---|
| 1,056,447 | Pink | Mar. 18, 1913 |
| 1,947,160 | Holzwarth | Feb. 13, 1934 |
| 2,362,580 | Nadeau et al. | Nov. 14, 1944 |
| 2,668,134 | Horton | Feb. 2, 1954 |
| 2,772,160 | Hepher | Nov. 27, 1956 |
| 2,874,046 | Klockgether et al. | Feb. 17, 1959 |
| 2,943,936 | Spechler | July 5, 1960 |
| 2,999,016 | Beeber et al. | Sept. 5, 1961 |
| 3,017,287 | Berry et al. | Jan. 16, 1962 |
| 3,072,482 | Beeber, et al. | Jan. 8, 1963 |

FOREIGN PATENTS

| | | |
|---|---|---|
| 108,657 | Pakistan | Jan. 29, 1959 |